(12) United States Patent
Nolf et al.

(10) Patent No.: US 6,344,615 B1
(45) Date of Patent: Feb. 5, 2002

(54) CLOSURE HAVING AN ADJUSTABLE VOLUME SEALANT CHAMBER

(75) Inventors: Jean-Marie Etienne Nolf, Korbeek-Lo; Johan Legrand, Nieuwrode; Valere Buekers, Zelem-Halen; Dirk Deroost, Baal; David Arthur Wittmeier, Brussels; Christiaan Radelet, Scherpenheuvel; Peter Bos, Deurne Diest, all of (BE)

(73) Assignee: Tyco Electronics Raychem N.V. (BE)

( * ) Notice: Subject to any disclaimer, the term of this patent is extended or adjusted under 35 U.S.C. 154(b) by 0 days.

(21) Appl. No.: 09/673,756

(22) PCT Filed: Mar. 30, 1999

(86) PCT No.: PCT/GB99/00993

§ 371 Date: Oct. 19, 2000

§ 102(e) Date: Oct. 19, 2000

(87) PCT Pub. No.: WO99/56370

PCT Pub. Date: Nov. 4, 1999

(30) Foreign Application Priority Data

Apr. 28, 1998 (GB) .............................................. 9808963
Mar. 18, 1999 (GB) .............................................. 9906210

(51) Int. Cl.⁷ .............................................. H02G 7/06
(52) U.S. Cl. ...................................................... 174/92
(58) Field of Search ................................ 174/92, 77 R, 174/93, 138 F

(56) References Cited

U.S. PATENT DOCUMENTS

| 4,600,261 A | 7/1986 | Debbaut ..................... 439/521 |
| 4,634,207 A | 1/1987 | Debbaut ..................... 439/521 |
| 4,716,183 A | 12/1987 | Gamarra et al. .............. 522/80 |
| 4,859,809 A | 8/1989 | Jervis .......................... 174/92 |
| 6,218,620 B1 * | 4/2001 | Michel ........................ 174/92 |

FOREIGN PATENT DOCUMENTS

| WO | WO 90/05401 | 5/1990 |
| WO | WO 92/22114 | 12/1992 |
| WO | WO 95/15600 | 6/1995 |
| WO | WO 95/24756 | 9/1995 |
| WO | WO 96 02080 | 1/1996 |
| WO | Wo 96/19024 | 6/1996 |
| WO | WO 97/27655 | 7/1997 |
| WO | WO 97/45904 | 12/1997 |

OTHER PUBLICATIONS

Copy of International Search Report, No date.
Copy of International Preliminary Examination Report, No date.

* cited by examiner

*Primary Examiner*—Chau N. Nguyen

(57) ABSTRACT

A closure is provided including a casing part having at least one opening configured to receive an elongate object within the casing part. A sealing chamber defined by the casing part is positioned adjacent the opening so as to receive the elongate object in the sealing chamber and a sealant material is positioned in the sealing chamber. A relatively displaceable wall part of the casing part in provided in various embodiments which communicatively contacts the sealant material and is coupled to another part of the casing part by a flexible hinge part so as to allow movement of the relatively displaceable wall part relative to the other part of the casing. A compression means may be provided for applying a compressive force to the sealant material through the relatively displaceable wall part. In further embodiments a displaceable plunger is provided defining a wall of the sealing chamber and an externally operable shaft threadably engages the plunger so as to displace the plunger to adjust a volume of the sealant chamber.

32 Claims, 7 Drawing Sheets

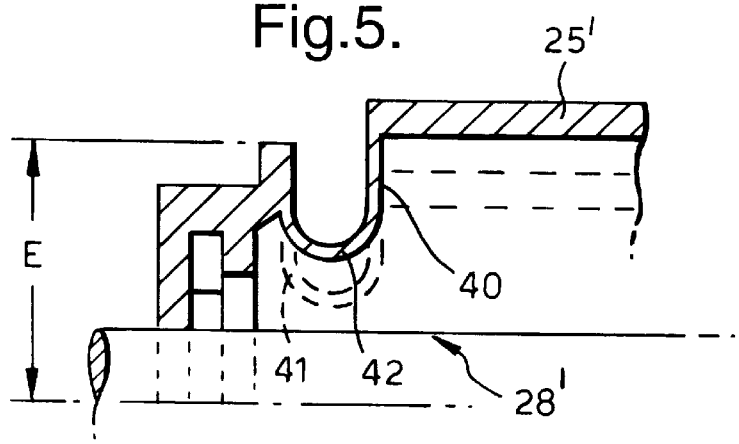
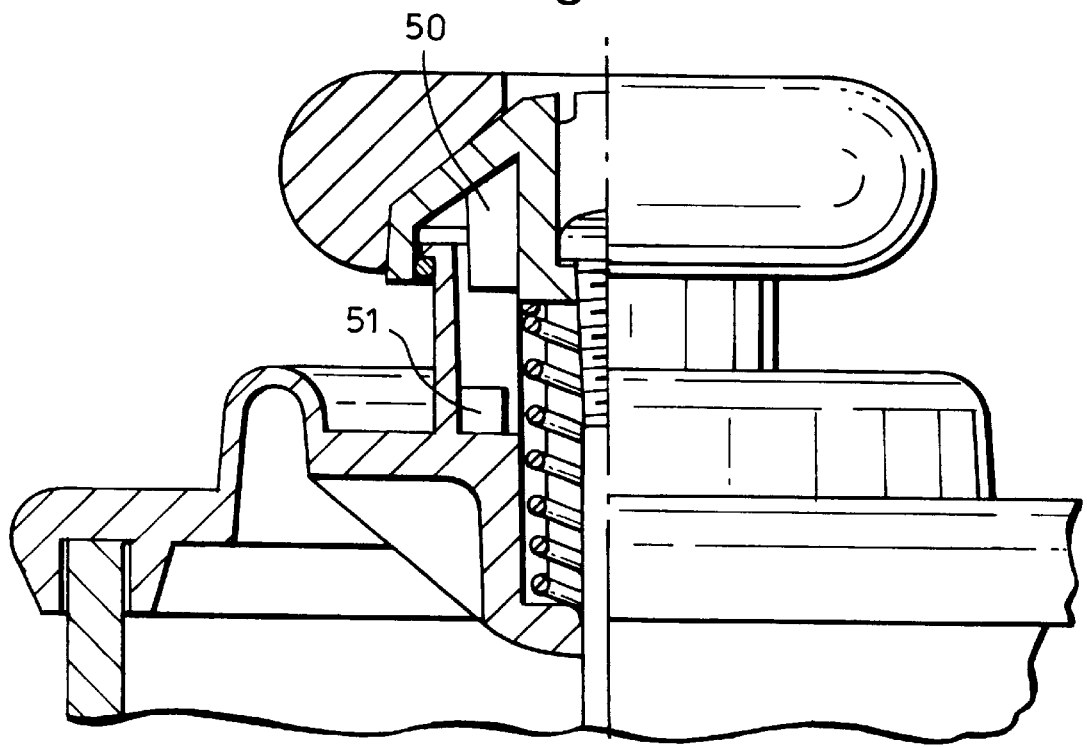

CLOSURE HAVING AN ADJUSTABLE VOLUME SEALANT CHAMBER

FIELDS OF THE INVENTION

The present invention relates generally to a closure, and particularly to a closure for enclosing one or more elongate objects.

The present invention finds particular utility as a closure for protecting junctions between elongate objects such as pipes or cables. The term "cable" will be understood hereinafter to include both conductive cables and bundles of optical fibres. When it is necessary to make connections between elongate objects such as pipes or cables the junction or splice where such objects are joined end-to-end is necessarily less strong and less resistive to environmental agents liable to cause deterioration over time than the cable itself.

BACKGROUND OF THE INVENTION

In the production of, for example, cable systems such as telecommunication or power transmission systems, it is frequently necessary to make splices either to join cables end-to-end or to make a branch. The cables and the splices may be located underground, in conduits or in other environments, inside or outside buildings, but in any event are always at risk to the ingress of environmental agents such as moisture and humidity or dust. Underground installations are also subject to pressure, and in particular hydrostatic pressure, whilst above-ground installations suffer from diurnal thermal dilatations. In order to provide environmental seals for splices in cables or other elongate objects various protective measures are known. Systems utilising an enclosing casing with a gel or other suitable sealing material enclosed within it have been found to be particularly valuable. One advantage of using closures containing a gel or other such sealing material lies in the fact that they can be installed at room temperature, and by utilising compression means the gel can be maintained in contact with all the interior surfaces of a closure as well as the exterior surfaces of the cable or other elongate object the splice in which is to be protected. The force applied by the compression means must be sufficiently great to overcome any forces which may be exerted by the environmental agents, such as the hydrostatic head in underground installations. The requirement for a compressive force on a sealing material has been recognised for some years and is described in various prior art documents. In particular, U.S. Pat. No. 4,600,261 (Raychem) describes an apparatus and method for protection of electrical contacts in which the apparatus includes a gel, first means to contain the gel, second means to retain the gel within the first means, and a force means which acts on the first means so that the gel is maintained in compressive contact with the electrical contacts and substantially encapsulates the conductive portion of them.

In that document the means for applying the force comprised an external clip or spring by which two halves of a closure casing were held together and pressed into contact with one another by the spring. Although effective this system has the disadvantage that the components must be made to accommodate a particular size (or relatively narrow size range) of elongate objects over which the spring can exert an appropriate force.

In order to ensure the sealing effect cable closures incorporating relatively displaceable end walls displaceable by screw-threaded means were devised, as described in WO 95/15600 (Raychem). A spring interposed between a nut and a displaceable end wall acting effectively as a piston allowed compression to be applied to a sealing material encapsulated within the sealing closure. It was also appreciated that the displacement direction need not be parallel to the length of the elongate objects enclosed within the casing, but could be transverse this direction, and the above prior art document also describes the provision of piston-like members acting perpendicularly to the length of an enclosed cable whereby to place a gel under compression.

Although all of these arrangements act well to provide a secure seal they nevertheless offer only a secure seal over a relatively limited range of cable diameters. In order to be able to provide a secure seal over a relatively large range of diameters of elongate objects such as cables a relatively large range of movement must be available in order to change the volume of the containment closure over a wide range.

SUMMARY OF THE INVENTION

The present invention seeks to provide a closure for elongate objects which is capable of accommodating such objects over a relatively wide range of dimensions, preferably up to a 3:1 ratio of diameters, whilst nevertheless offering a secure seal against environmental agencies.

According to one aspect of the present invention a closure casing comprises two casing parts, means for holding the two casing parts together in juxtaposed relationship, and having means for sealing between an elongate article penetrating the casing and the casing itself, the casing parts having respective cavities together forming a sealant chamber for receiving sealant material and through which the elongate article passes in penetrating the closure casing, the volume of the sealant chamber being adjustable whereby to apply a compressive force to sealant material therein, the adjustment being effected by displacement of at least one element located within the said sealant chamber, the said element being displaceable within the chamber by selectively operable position—adjustment means of the casing whereby to determine the effective volume of the sealant chamber.

According to a second, more general aspect of the present invention there is provided a closure casing having means for sealing a space between an elongate article penetrating the casing and the casing itself, the casing comprising two opposite casing parts having means for holding them together in juxtaposed relationship and each having respective cavities together forming a sealant chamber for receiving sealant material and through which the elongate article passes in penetrating the closure casing, and means for applying a compressive force to the sealant material transversely of the length of the elongate article whereby to urge it into intimate contact with the said elongate article to seal thereto, in which the said means for applying a compressive force comprise selectively operable adjustment means for determining displacement of a movable member the position of which determines the effective volume of the said sealant chamber.

In one embodiment of the present invention the said displaceable element comprises a plunger guided for movement within the said sealant chamber in a direction substantially transverse the length of the said elongate article. Preferably there are two relatively displaceable plungers interconnected and guided for substantially rectilinear movement within the said sealant chamber.

The said two plungers may be interconnected by screw threaded adjustment means.

Compression on the sealant may be maintained after adjustment, despite changes in volume due to thermal and other effects if there are provided energy storage means between the adjustable position-determining means and the said at least one displacement element. Such energy storage means may comprise a spring, preferably a compression coil spring.

In a preferred embodiment of the invention the screw threaded adjustment means comprise a threaded shaft having operating means at one end thereof by which the shaft is turnable, and a cooperating threaded hole in one of the said two plungers, the spring acting between the other of the two plungers and the said operating means.

In another aspect the present invention comprises a closure comprising a closure casing having openings for the passage of elongate objects and sealing means including a sealing material enclosed within at least part of the closure casing, in which the sealing means includes a relatively displaceable wall part of the closure joined to the remaining part of the closure by a flexible hinge part, and adjustable position-determining means for determining the relative position of the said relatively displaceable part of the closure and the remaining part thereof whereby to regulate the effective volume of the said part of the closure and thus the pressure on a material contained therein.

Preferably the said flexible hinge part is of corrugated or bellows configuration and extends at least partly around the said relatively displaceable wall part. Alternatively the flexible hinge part may comprise or include ligament hinges between appropriately shaped hinged wall parts. As used in this specification the term "ligament hinge" will be understood to refer to a hinge formed integrally in a body of material such as polypropylene and defined by a line of reduced thickness at which molecular orientation under stress takes place during preliminary flexing.

The said flexible hinge part is, however, preferably formed as a roll seal. The roll seal preferably comprises a flexible wall portion around the periphery of the said relatively displaceable wall part, having a single U-shape cross section. This U-shape cross section may be convex towards the interior or the exterior of the casing although, for reasons which will be explained in more detail below, it is preferred that the roll seal is convex towards the interior of the casing.

In order to obtain the maximum range of variation in the dimensions of the elongate objects which can be sealingly accommodated within the closure it is preferred that the said relatively displaceable wall part of the closure is displaceable transversely of the length direction of the said elongate objects.

Various different means for determining the position of the relatively displaceable wall part may be adopted. Preferably, however, the adjustable position-determining means comprise co-operating screw-threaded components acting to apply a force between the said relatively displaceable wall part of the closure and the remaining part thereof. Alternatively, lever mechanisms, especially toggle mechanisms may be provided for this purpose.

In embodiments in which the adjustable position-determining means are screw-threaded components, there may be further provided energy storage means between the said adjustable position-determining means and the said relatively displaceable wall part of the closure. Conveniently such energy storage means comprise a spring which, in the preferred embodiment is a compression spring, preferably a coil spring.

In one embodiment of the invention the co-operating screw-threaded components comprise a threaded shaft and a nut, one operatively linked to the said relatively displaceable wall part of the closure and the other operatively linked to the remaining part of the closure. Relative rotation between the said threaded shaft and the said nut can be effected by means of a control knob connected to one of them, the dimensions of the control knob being such as to extend over the said flexible hinge part of the closure whereby to protect it from incident ultraviolet radiation. This is particularly convenient if the said flexible hinge is formed as a roll seal as described above since such a seal may comprise relatively thin flexible material which could be degraded over time by UV radiation causing it to harden and therefore crack.

In order to achieve a suitable degree of compression of the sealing material, and in particular to allow accommodation of dimensional variations (both expansion and contraction) due to thermal dilatation, it is preferred that there be provided means for identifying the attainment of a predetermined energy storage state of the said energy storage means. In embodiments in which the energy storage means comprise a compression spring, the said means for identifying the attainment of a predetermined energy storage state may comprise co-operating components on two relatively movable members, which come into interfering relationship with one another when the energy storage means is in the said predetermined energy storage state. Preferably the sealing material comprises a gel. Suitable gel materials have been described in the prior art, and may comprise one which preferably has a cone penetration value from 100 to 350 ($10^{-1}$ mm), more preferably 200–260, especially 230–250, and an ultimate elongation of at least 200%. Cone penetration may be chosen to ensure that the material is able to be deformed around the elongate objects to be sealed avoiding air voids, but without excessive flow or if desired excessive relaxation over time, and the ultimate elongation may be chosen to ensure that on re-entry into the splice case the material is pulled away from the elongate objects, such as conductors, by the separation of two casing halves of the closure. Cone penetration is measured by ASTM D217-68 at 21° C. on an undisturbed sample using a standard 1:1 scale cone (cone weight 102.5 g, shaft weight 47.5 g), the penetration being measured after 5 seconds. Elongation is measured by ASTM D638-80 at 21° C. using a Type 4 die to cut the sample, and at a speed of 5 cm/minute.

Suitable sealing can be made by gelling curable polyurethane precursor materials in the presence of substantial quantities of mineral oil, a vegetable oil or a plasticizer or a mixture thereof. The amount of plasticizer may be, for example, 30–70% by weight of the total in the case of a plasticizer such as trimellitate, or 60–80% in the case of a mineral or vegetable oil. Mineral and vegetable oils may be mixed, for example in the ratio 0.7–2.4 parts by weight of mineral oil to 1 part by weight of vegetable oil. Other suitable sealing materials may be made by curing reactive silicones with non-reactive, extender, silicones. A further class of materials comprises those formed by extending triblock copolymers, such as styrene-ethylene-butylene-styrene copolymers (for example that sold under the Shell trade mark Kraton) with a mineral oil. These sealing materials are disclosed in U.S. Pat. Nos. 4,634,207 (Debbaut) and 4,716,183 (Gamarra), the disclosures of which are incorporated herein by reference.

Other suitable materials are discussed in detail in International Application published under WO 92/22114 (Raychem) the disclosure of which is incorporated herein by reference.

It is preferred that the gel is injection moulded into two opposite parts of the closure although it may be pre-formed as blocks.

BRIEF DESCRIPTION OF THE DRAWINGS

Various embodiments of the present invention will now be more particularly described, by way of example, with reference to the accompanying drawings in which:

FIG. 5 is a partial sectional view illustrating the action of the roll seal;

FIG. 6 is a partial sectional view of an alternative embodiment of the present invention showing the operation of the inclination means for identifying a predetermined energy storage state;

DETAILED DESCRIPTION OF THE ILLUSTRATED EMBODIMENTS

Figure 1:
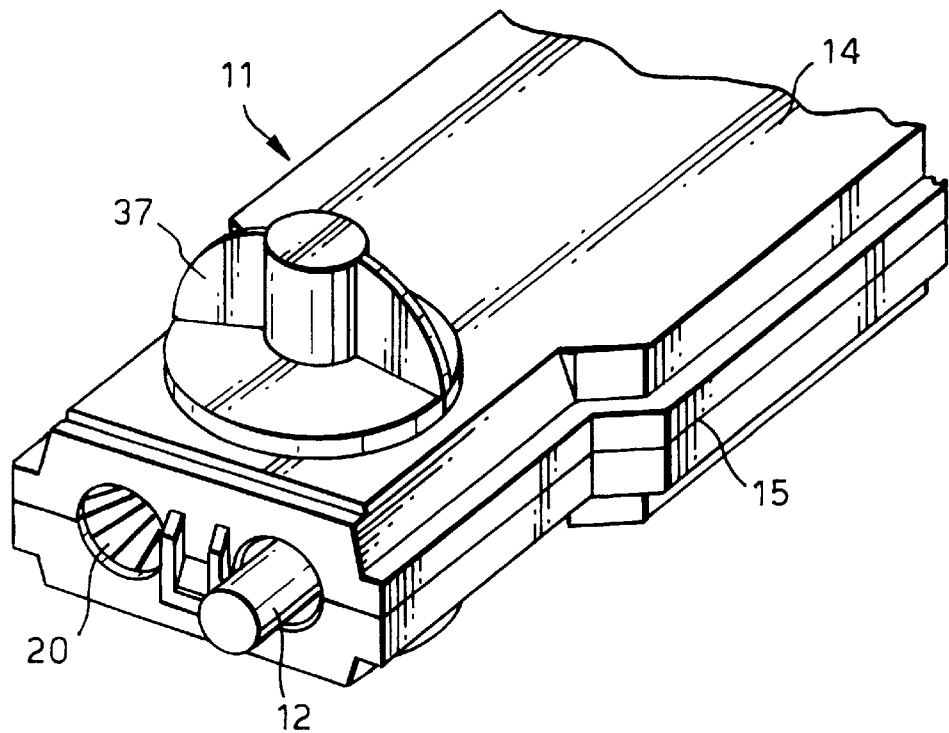
FIG. 1 is a schematic perspective view of a first embodiment of the invention in assembled condition.

Referring now to the drawings, there is shown one part of a closure casing, generally indicated 11, for housing splices between two cables only one of which is schematically represented at 12. The cables may be conductors or optical fibres. It will be appreciated that only one half of the casing 11 is illustrated, the other half being a mirror image of substantially identical components at the opposite end and have been omitted for clarity.

Figure 2:
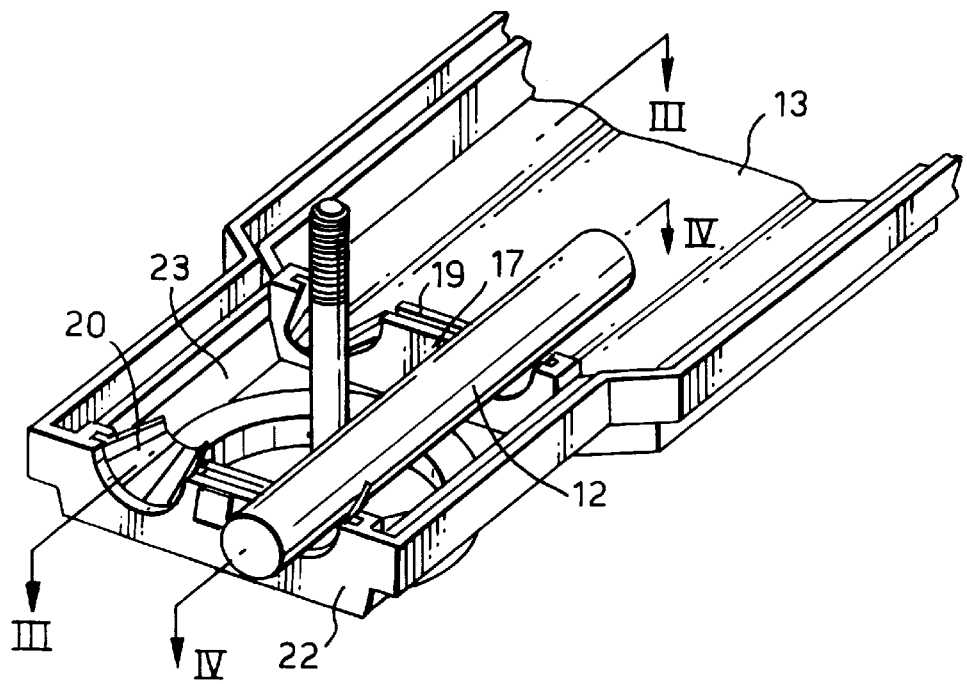
FIG. 2 is a corresponding perspective view of a lower half of the closure casing of the embodiment of FIG. 1.
Figure 3:
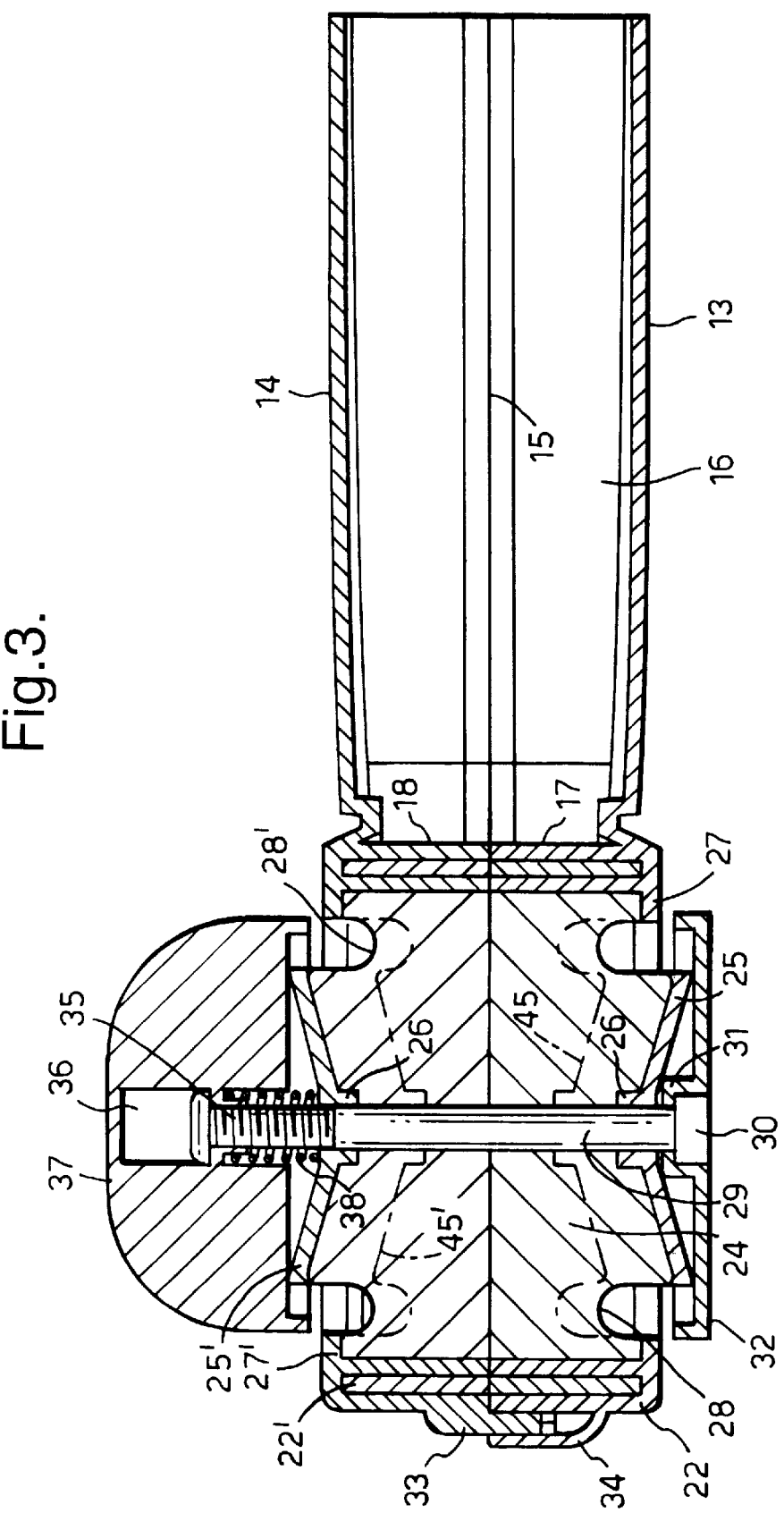
FIG. 3 is a sectional view taken on the line III—III of FIG. 2.

As can be seen in FIGS. 1, 2 and 3 the closure casing 11 comprises a first or tray part 13 and a second or cover part 14 which meet along a longitudinal separation line generally indicated 15 in correspondence with which there is formed a longitudinal seal which may be of conventional form and which, therefore, will not be described in detail herein. The two parts 13, 14 of the closure casing 11 define a main chamber 16 within which splices between the elongate cables 12 may be housed. Appropriate cables organisers, splice connectors and the equipment may be housed in the chamber 16 but are not illustrated here for clarity. The tray member 13 and cover member 14 have corresponding transverse partition walls 17, 18 having respective grooves or channels (only one of which, channel 19, is visible in FIG. 2) for receiving respective crown flanges 20 which define the seatings for receiving the cables 12. Each crown flange 20 is formed as a semi-conical element with a plurality of flexible fingers extending axially from a radial flange 21. Such elements are known and described, for example, in our earlier International Patent Application PCT/GB95/00469 published under International Publication No. WO 95/24756. The radial flange part 21 of a crown flange is received in the groove 19 to locate it in position, and the difference in diameter between the larger diameter end at the flange 21 and the smaller diameter end at the free end of the flexible fingers, defines the range of diameters of cable 12 which can be accommodated.

The end portion of the lower tray part 13, between the partition wall 17 and an end wall 22 thereof defines a sealing chamber 23 which is filled with a gel material 24 in use of the closure casing.

Figure 4:
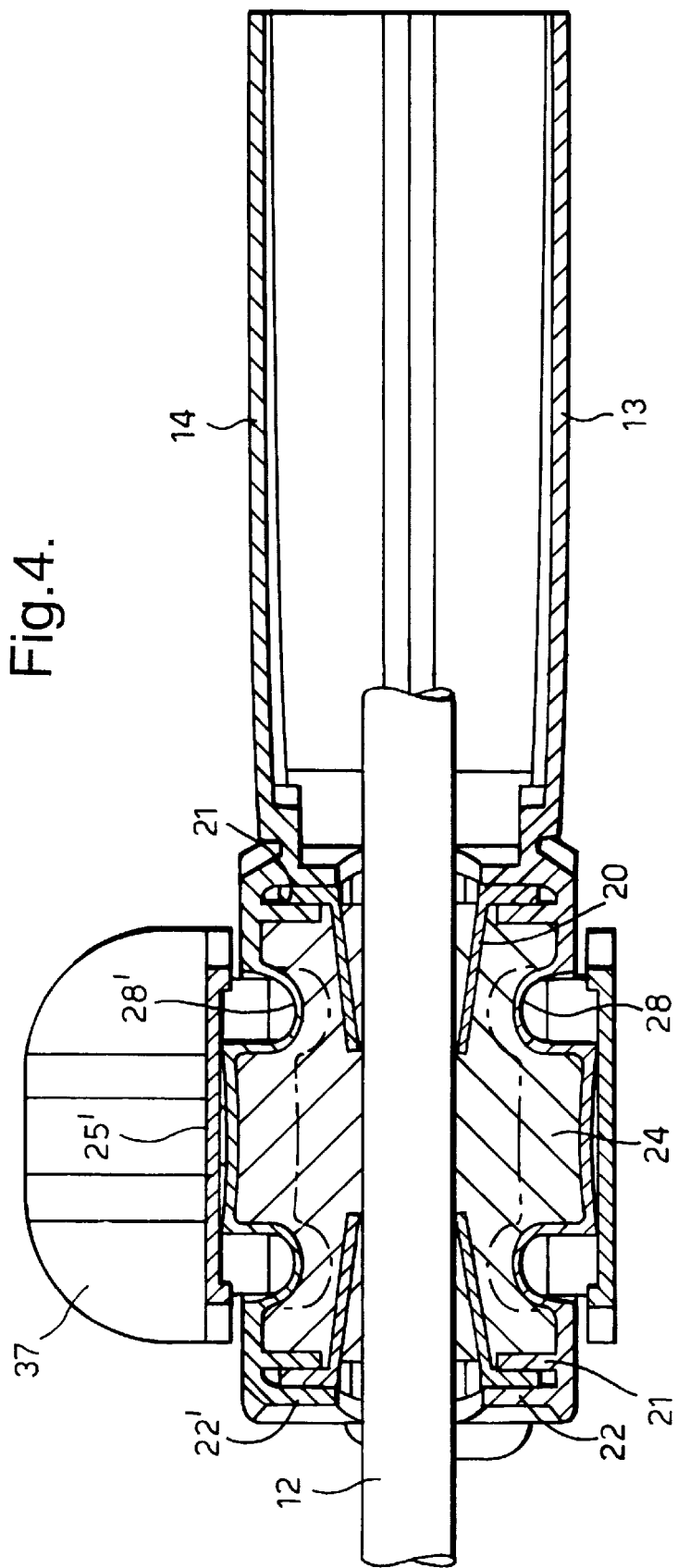
FIG. 4 is a sectional view taken on the line IV—IV of FIG. 2.

A bottom wall of the sealing chamber 23 comprises a central, slightly domed, substantially rigid "piston" part 25 having a central boss 26. The piston part 25 is circular in plan form, as can be seen in FIG. 2, and joined to the remainder of the bottom wall 27 of the sealing chamber 23 by a generally U-section roll seal 28 comprising a thin, integrally formed membrane joining the outer periphery of the piston member 25 with the circular inner perimeter a rigid part of the bottom wall 27 of the sealing chamber 23. As can be seen in FIGS. 3 and 4, the thickness of the roll seal membrane 28 is considerably less than that of the bottom wall 27 or the piston part 25 although they are integrally formed of the same material. Due to the reduced dimensions of the wall thickness the roll seal part 28 is substantially flexible whilst the bottom wall 27 and the piston part 25 are substantially rigid.

Through the boss 26 passes a shaft 29 having a threaded end portion and an enlarged head 30 received in a cavity in a central boss 31 of a circular reinforcing disc 32 which has a slightly larger diameter than that of the piston part 25 but slightly less than the inner perimeter of the bottom wall 27.

The cover part 14 of the casing has a corresponding configuration the components of which are identified with the same reference numerals as those used for the lower tray part, but distinguished with a '. The cover part 14 differs from the tray part 13 only in the configuration of the end wall 22' which in the cover part 14 has a tab 33 for engagement in a correspondingly shaped channel 34.

The shaft 29 passes through the apertured boss 26' of the "piston" portion 25' of an upper wall 27' of the end part of the upper cover 14 and is engaged by a nut 35 which is captive in a cavity 36 of a control knob 37. Between the nut 35 and the "piston" 25' is a compression coil spring 38.

The gel filling 24 (24' in the upper part) is preferably injection moulded into each half of the closure casing during manufacture. As can be seen in FIG. 2, in use of the closure casing 11, elongate cables 12 are laid into the seatings provided by the crown flanges 20 engaged in the grooves 19 of the partition wall 17 and a corresponding groove in the end wall 22. Appropriate splicing operations are performed on the end of the cable 12 projecting into the main chamber 16 to join it, for example, to corresponding end portions of an aligned cable projecting into the chamber 16 from the opposite end (not shown) of the casing 11. The cover 14 is then placed over the tray part 13 with suitable longitudinal seals made along the edges joining at the longitudinal junction line 15. Such seals are known and will not be described herein.

The gel fillings 24, 24' which have been introduced into the chamber 23 preferably by injection moulding (although pre-shaped blocks may alternatively although non-preferably be used) meet to form a complete filling for the interior of the chamber 23 and the threaded shaft 29 is then introduced through the aligned openings in the bosses 26, 26', the spring 38 is fitted over the end and the control knob 37 fitted by screwing the nut 35 on to the threaded end of the shaft 29.

The gel material 24 can be placed under a suitable compressive load by turning the knob 37 to compress the spring 38 by an appropriate extent. It is desirable that the spring 38 should not be fully compressed such that the adjacent turns thereof come into contact with one another since this would not allow relative separation of the movable wall parts (the "pistons" 25, 25') and to prevent this from happening, whilst nevertheless ensuring that the gel 24 is placed under a suitable compressive load, an indicator device acting to give the operator feedback as to the degree of compression of the spring 38 may be provided. Such device may, for example, be in the form of two interfering projections on corresponding relatively movable components, such as that described in International Patent Application published under Publication No. WO 92/22114 the disclosure of which is incorporated herein by reference. A suitable configuration of components is described hereinbelow with reference to FIG. 6. This comprises oppositely directed projections 50, 51 on the control knob 37 and the piston 25' which interfere with one another to prevent further rotation of the knob 37 when this and the piston reach a predetermined separation which corresponds to a predetermined compression of the spring 38 less than full compression.

Alternative arrangements may be made to indicate to the user that a suitable mid-range compression has been achieved, for example by providing a second spring which comes into play part way through the compression of the main spring 38, or by a change in the shape of the screw thread or provision of, for example, a fibre washer all of which serve to provide an indication to the user by increasing the force which must be applied to the control knob 37.

Turning now to FIG. 5 there is shown a schematic illustration of a part of the U-shape section of the roll seal 28' of the cover part 14. It will be appreciated that the roll seal 28' effectively comprises three parts namely a radially inner limb 40, a radially outer limb 41 and a bight portion 42. In its relaxed state, as formed, the radially inner limb 40 has its maximum length whilst the radially outer limb 41 has its minimum length. The bight portion 42 obviously joins these two limbs and is formed from them as the roll seal moves upon displacement of the piston portion 25' from the position shown in solid outline in FIG. 5 to the position shown in broken outline, in which position the radially inner and outer limbs 40, 41 are of equal length.

The advantage of providing the roll seal 28' in the configuration illustrated, namely with its convex face directed towards the interior of the chamber 23, lies in the fact that, upon displacement of the piston 25' from the relaxed position towards a position in which the gel 24 is compressed, material of the roll seal 28' moves radially around the bight portion 42 from the inner limb 40 towards the outer limb 41. Because the inner limb 40 lies at a smaller radius than the outer limb 41 the circumference of the radially outer limb portion 41 is greater than that of the radially inner limb portion 40 so that the material of the roll seal is placed under tension by this movement, which is a stress the material is better capable of withstanding than compressive stress which would be the case if the displacement of the piston 25' to move from its starting position to its working position resulted in transfer of material from the radially outer limb 41 towards the radially inner limb 40. Although the described configuration is preferred, it is by no means impossible that an outwardly convex roll seal could be used. Furthermore, although a single U-shape roll seal has been described, it would be possible for this to be a corrugated or bellows-configuration seal with more than one corrugation.

Obviously, as the spring 38 is compressed the shaft 29 is placed under tension drawing together the two pistons 25, 25' to reduce the volume of the sealing chamber 23 and thus place the gel 24 under compression. The broken lines 45, 45' show the maximum excursion of the pistons 25, 25' which can result in a variation in the volume of the sealing chamber 23 of a considerable extent, and certainly much more than the change in volume which could be achieved using the rigid slidable pistons previously known for this purpose. Moreover, the utilisation of an integrally formed roll seal 28, 28' provides absolute security against escape of the gel in these regions, which could not be guaranteed in the case of a sliding piston.

Figure 7:
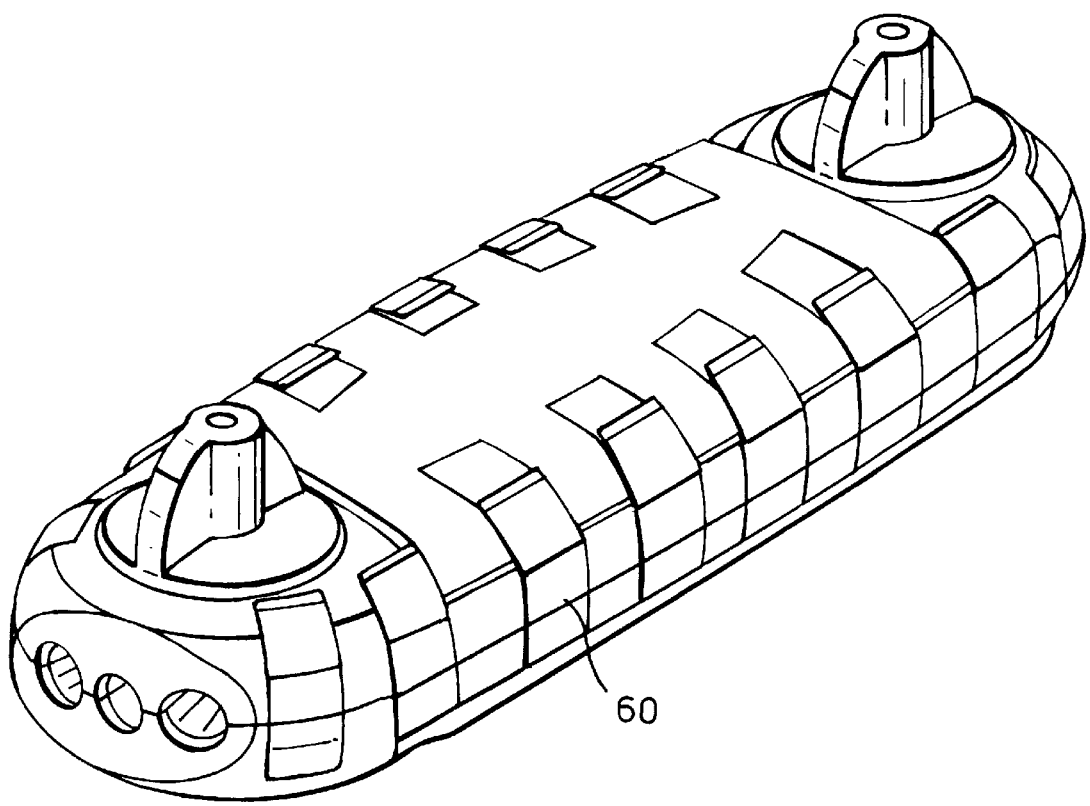
FIG. 7 is a perspective view showing the external configuration of an exemplary embodiment of the invention.

FIG. 7 shows one proposed configuration for a closure casing of the invention. In this embodiment the upper and lower halves of the casing are held together by toggle clips 60. This has the advantage of allowing the closure to be re-enterable to effect changes in the splice configuration or repairs as necessary.

Figure 8:
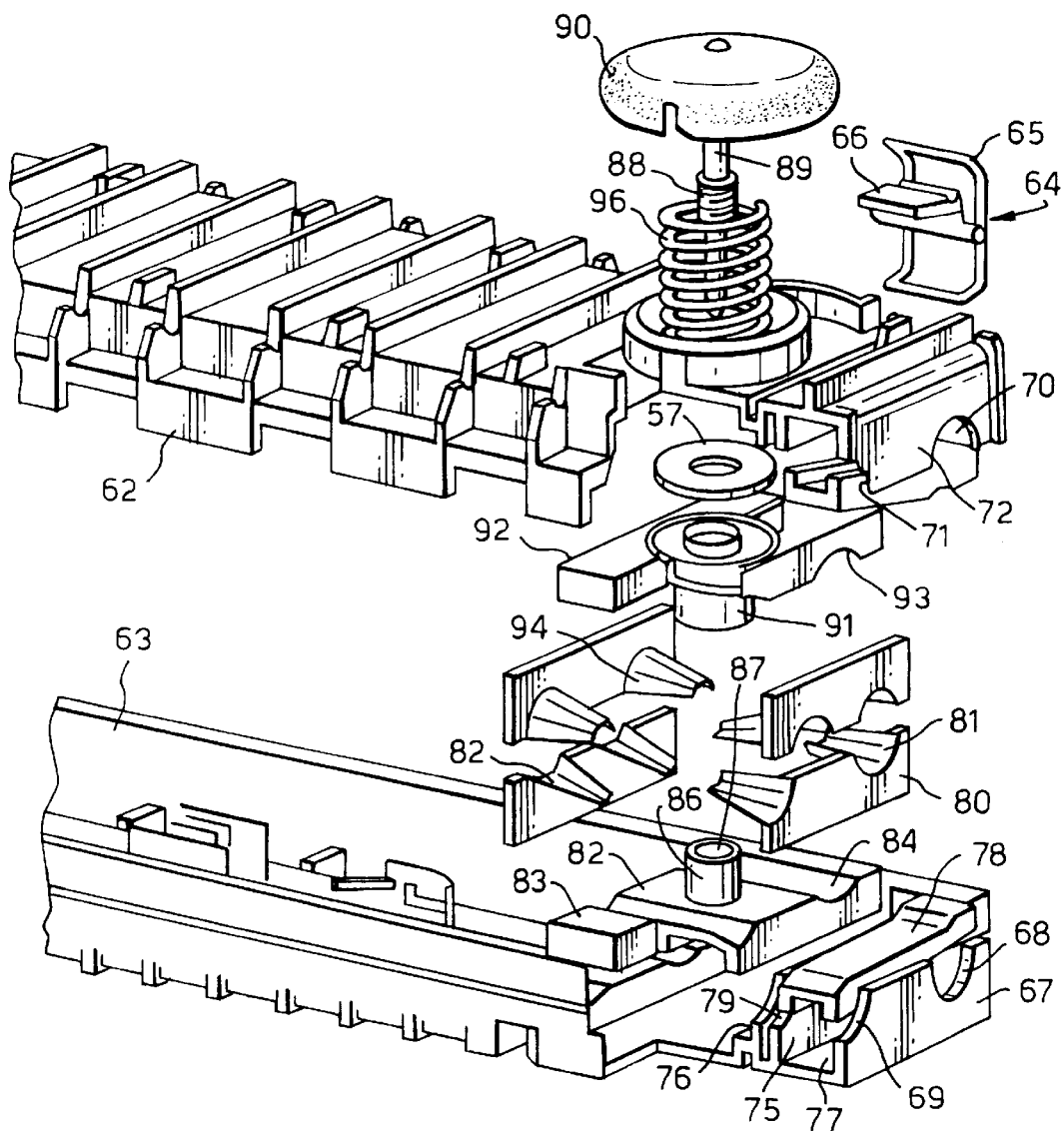
FIG. 8 is an exploded perspective view of a further embodiment of the invention having separate displaceable members in the sealant chamber.
Figure 9:
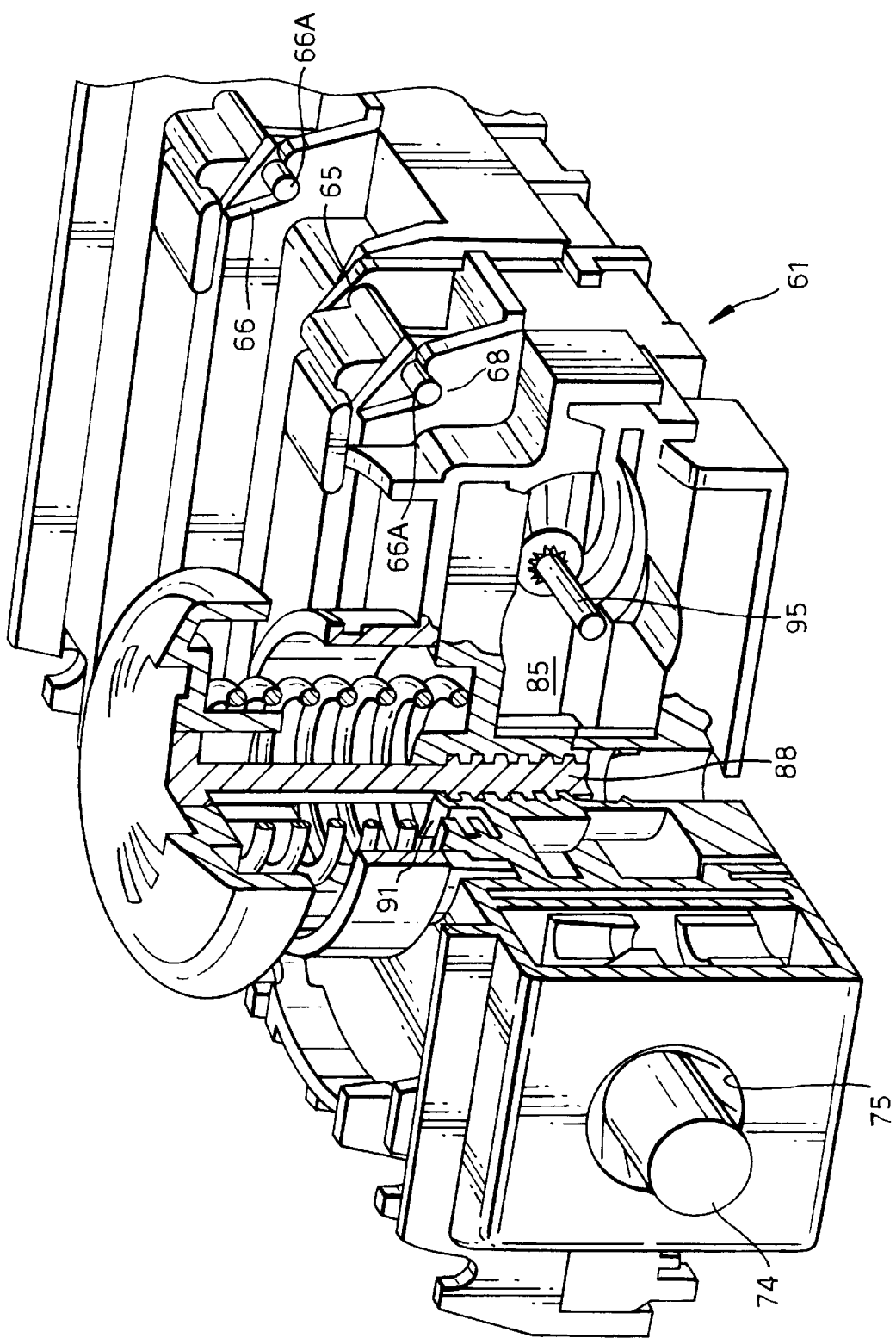
FIG. 9 is a cutaway perspective view of the embodiment of FIG. 8 in the assembled condition.

In the alternative embodiment illustrated in FIGS. 8 to 10 there is shown a closure casing, generally indicated 61 comprising two cooperating casing parts 62, 63 in the form of half-shells which can be held together in juxtaposed relationship by a set of spring clips 64 each comprising a closed loop 65 of spring wire and a toggle lever 66 having pivot pins 66A which engage in cooperating recesses 68 of the upper (as viewed in the drawings) casing half 62 whereby to clamp the two casing halves together.

The lower (as viewed in the drawings) casing half 63 is shown in FIG. 8 with a portion adjacent its end cut away to illustrate the internal configuration of the sealing means at the end.

A transverse end wall 67 has two arcuate, semi-circular notches 68, 69 which, together with corresponding notches 70, 71 in an end wall 72 of the "upper" casing half 62 form circular openings (only one of which, identified 73, is visible in FIG. 9) through which passes an elongate article 74, in this example a bundle of optical fibres or cables intended to be spliced or joined within the casing 61.

A second transverse wall 75 parallel to the transverse end wall 67 defines, with this latter, a chamber 77 for receiving a clamp member 78 loosely fitted within the chamber 77 and to be described in more detail below. A second transverse wall 76 closely adjacent the wall 75 defines a narrow slot 79 for receiving a lip 80 of a crown flange 81, whereby to locate the crown flange in position over a lower plunger 82 having two shaped channels 83, 84 for receiving respective parts of the crown flange 81.

The plunger 82 is located between the transverse wall 76 and a further wall (not visible in the drawings) which between them define a sealant chamber 85 which will be described in more detail below.

Projecting upwardly from a central portion of the plunger 82 is a cylindrical sleeve 86 which, as can be seen in FIG. 9, carries a helical internal rib forming a thread 87 for cooperation with a threaded part 88 of a stem 89 at the upper end of which is located an operating knob 90. The rod 89 is located within a sleeve 91 of an upper plunger 92 a skirt portion of which engages over the cylindrical sleeve 86 when the casing 61 is assembled. The lower plunger 82 and upper plunger 92 define opposite facing walls of the sealant chamber 85 and can be caused to approach or separate from one another by manipulation of the knob 90 causing the shaft 89 to rotate thereby screwing the threaded portion 88 into or out from engagement with the thread 87 in the lower plunger 82.

Like the lower plunger 82 the upper plunger 92 has shaped channels 93 for receiving cooperating crown flanges 94.

As can be seen in FIG. 9, a smaller-diameter elongate article 95 is shown engaged between the crown flanges 81, 94 at the relatively narrow tapered end which engages over the article 95. Gel sealant of a type described hereinbefore may be introduced into the sealant chamber 85, either by injection moulding as described above, or by the introduction of separate gel elements. Upon introduction of the elongate articles 74, 95 and assembly of the casing 61, a secure seal against the ingress of environmental contaminants into the interior of the casing can be achieved by turning the knob 90 to cause the plungers 82 and 92 to approach one another, maintaining a symmetrical configuration within the chamber 85, and applying a compressive force to the gel.

A coil spring 96 is engaged over the threaded shaft 88 between the knob 90 and the upper face of the plunger 92, with a bearing plate 97 interposed between them, such that the force between the shaft 89 and the plunger 92 is transmitted via the spring 96 which is compressed as the shaft 89 is screwed into the plunger 82 thereby creating a residual energy store which maintains the compression on the gel in the manner described hereinabove in relationship to the embodiment of FIGS. 1 to 8. A suitable arrangement for determining when an appropriate degree of compression of the spring 96 has been achieved may also be provided as described hereinbefore, although such arrangement is not illustrated in FIGS. 9 to 10. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A closure casing for enclosing an elongate article, the closure casing comprising:
   two opposite casing parts having holding means for holding them together in juxtaposed relationship, each casing part having respective cavities which together form a sealant chamber for receiving sealant material through which the elongate article passes in penetrating the closure casing;
   compression means for applying a compressive force to the sealant material transversely of the length of the elongate article to urge the sealant into contact with the elongate article to seal thereto;
   wherein the compression means further comprises a displaceable element guided for movement within the sealant chamber in a direction substantially transverse the length of the elongate article; and
   wherein the displaceable element further comprises at least one plunger guided by externally operable screw threaded position-adjustment means rotatably engaging the at least one plunger.

2. A closure casing according to claim 1, in which the at least one plunger comprises two relatively displaceable plungers interconnected and guided for substantially rectilinear movement within the sealant chamber.

3. A closure casing according to claim 2, in which the two plungers are interconnected by the position-adjustment means.

4. A closure casing according to claim 1 further comprising energy storage means positioned between the position-adjustment means and the at least one plunger.

5. A closure casing according to claim 4, in which the energy storage means further comprises a spring.

6. A closure casing according to claim 5, in which the spring comprises a compression coil spring.

7. A closure casing according to claim 4 wherein the position-adjustment means further comprises a threaded shaft having operating means at one end thereof by which the threaded shaft is turnable, and a cooperating threaded hole in, the at least one plunger, the energy storage means acting between an additional plunger and the operating means.

8. A closure casing according to claim 7, in which the operating means comprises at least one of a manually operable knob or a handle.

9. A closure casing according to claim 8, in which the identifying means further comprises co-operating components on two relatively movable members, which members come into an interfering relationship with one another when the energy storage means is in the predetermined energy storage state.

10. A closure casing according to claim 4 further comprising identifying means for identifying attainment of a predetermined energy storage state of the energy storage means.

11. A closure casing according to claim 1 wherein the sealing material comprises at least one of a gel or gelloid.

12. A closure casing according to claim 11 wherein the sealing material is injection moulded into the closure casing.

13. A closure casing comprising:
   a casing part having at least one opening configured to receive an elongate object within the casing part;
   a sealing chamber defined by the casing part positioned adjacent the at least one opening so as to receive the elongate object in the sealing chamber;
   a sealant material positioned in the sealing chamber;
   a relatively displaceable wall part of the casing part communicatively contacting the sealant material;
   a flexible hinge part coupling the relatively displaceable wall part to another part of the casing part so as to allow movement of the relatively displaceable wall part relative to the another part of the casing part; and
   a position-adjustment shaft positioned to displace the relatively displaceable wall part so as to adjust a volume of the sealant chamber.

14. A closure casing according to claim 13 wherein the flexible hinge part comprises at least one of a corrugated part, a bellows part or a rolling seal.

15. A closure casing according to claim 14 wherein the flexible hinge part comprises a U-section rolling seal.

16. A closure casing according to claim 15 wherein the U-section rolling seal comprises an integrally formed membrane joining the relatively displaceable wall part and the another part of the casing, the membrane being thinner than the relatively displaceable wall part and the another part of the casing.

17. A closure casing according to claim 15 wherein the U-section rolling seal is convex towards the sealing chamber.

18. A closure according to claim 14 wherein the relatively displaceable wall part comprises a domed piston part and wherein the flexible hinge part connects an outer periphery of the domed piston part to the another part of the casing.

19. A closure according to claim 18 wherein the another part of the casing comprises a rigid portion of a wall of the sealing chamber, the rigid portion having an inner perimeter defining a substantially circular opening in the sealing chamber, the domed piston part being positioned in the circular opening and the flexible hinge part connecting the outer periphery of the domed piston part to the inner perimeter of the rigid portion.

20. A closure according to claim 14 wherein the casing part comprises a first part and a mating second part and a seal between the first part and the second part.

21. A closure according to claim 20 further comprising a second relatively displaceable wall part of the casing part positioned across the sealing chamber from the first relatively displaceable wall part, wherein the first relatively displaceable wall part is coupled to the first part by the flexible hinge part and the second relatively displaceable wall part is coupled to the second part by a second flexible hinge part.

22. A closure according to claim 21 wherein the position-adjustment shaft displaces both the first relatively displaceable wall part and the second relatively displaceable wall part so as to provide a symmetrical configuration within the sealing chamber when the relatively displaceable wall parts are displaced towards each other to reduce the volume of the sealant.

23. A closure according to claim 22 further comprising a spring that couples the position-adjustment shaft to at least one of the relatively displaceable wall parts, the spring being positioned to provide a compressive load on the sealing material through the at least one of the relatively displaceable wall parts.

24. A closure according to claim 23 further comprising identifying means for identifying attainment of a predetermined compression of the spring.

25. A closure according to claim 14 wherein the flexible hinge part provides a seal between the relatively displaceable wall part and the another part of the casing part so as to provide security against escape of the sealant material from the sealing chamber between the relatively displaceable wall part and the another part of the casing part.

26. A closure casing comprising:

a casing part having at least one opening configured to receive an elongate object within the casing part;

a sealing chamber defined by the casing part positioned adjacent the at least one opening so as to receive the elongate object in the sealing chamber;

a sealant material positioned in the sealing chamber;

a relatively displaceable wall part of the casing part communicatively contacting the sealant material;

a flexible hinge part coupling the relatively displaceable wall part to another part of the casing part so as to allow movement of the relatively displaceable wall part relative to the another part of the casing part; and a compression means for applying a compressive force to the sealant material through the relatively displaceable wall part.

27. A closure casing comprising:

a casing part having at least one opening configured to receive an elongate object within the casing part;

a sealing chamber defined by the casing part positioned adjacent the at least one opening so as to receive the elongate object in the sealing chamber;

a sealant material positioned in the sealing chamber;

a displaceable plunger defining a wall of the sealing chamber; and an externally operable shaft threadably engaging the plunger so as to displace the plunger to adjust a volume of the sealant chamber.

28. A closure casing according to claim 27 wherein the plunger further comprises a sleeve member projecting upwardly from a central portion of the plunger, the central portion including a helical internal rib forming a thread, the externally operable shaft engaging the thread.

29. A closure casing according to claim 28 further comprising a second displaceable plunger defining a wall of the sealing chamber opposite the first displaceable plunger, wherein the externally operable shaft further engages the second plunger so as to displace the second plunger to adjust a volume of the sealant chamber.

30. A closure casing according to claim 29 further comprising a spring coupling the externally operable shaft to the second plunger.

31. A closure according to claim 30 further comprising identifying means for identifying attainment of a predetermined compression of the spring.

32. A closure casing according to claim 29 wherein the second plunger includes a sleeve member extending from a central portion of the second plunger towards the first plunger, the sleeve member of the second plunger being configured to slidably engage the sleeve member of the first plunger when the first plunger is displaced towards the second plunger.

* * * * *